(12) United States Patent
Feddema et al.

(10) Patent No.: US 6,377,878 B1
(45) Date of Patent: Apr. 23, 2002

(54) CONVERGENT METHOD OF AND APPARATUS FOR DISTRIBUTED CONTROL OF ROBOTIC SYSTEMS USING FUZZY LOGIC

(75) Inventors: John T. Feddema; Brian J. Driessen; Kwan S. Kwok, all of Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 0 days.

(21) Appl. No.: 09/603,568

(22) Filed: Jun. 23, 2000

Related U.S. Application Data

(60) Provisional application No. 60/141,054, filed on Jun. 24, 1999.

(51) Int. Cl.[7] .............................................. G08G 1/123
(52) U.S. Cl. ......................... 701/27; 701/23; 701/200; 701/300; 340/990; 340/998
(58) Field of Search ............... 701/27, 26, 23, 701/200, 206, 300; 340/990, 998; 364/424.01, 449, 443; 73/178 R

(56) References Cited

U.S. PATENT DOCUMENTS 5,283,575 A * 2/1994 Kao et al. ................... 340/990

OTHER PUBLICATIONS

Brooks, "A Robust Layered Control System for a Mobile Robot," IEEE Journal of Robotics and Automation, RA–2, pp. 14–23, Mar. 1986.

Maeda et al., "Behavior–Decision Fuzzy Algorithm for Autonomous Mobile Robots," Information Sciences, vol. 71, pp. 145–168, 1993.

Marapane et al., "Motion Control of Cooperative Robotic Teams Through Visual Observation and Fuzzy Logic Control," Proceedings of the 1996 International Conference on Robotics and Automation, pp. 1738–1743, 1996.

Feddema et al., "Explaining Finite State Machine Characteristics using Variable Structure Control," SPIE Conference on Sensor Fusion and Decentralized Control in Autonomous Robotic Systems, Pittsburg, Oct. 14–17, 1997, referred to as Feddema'97.

Feddema et al., "Designing Stable Finite State Machine Behaviors using Phase Plane Analysis and Variable Structure Control," Proceedings of 1998 IEEE International Conference on Robotics and Automation, Belgium, May 16–21, 1998, referred to as Feddema'98.

Miyata et al, "Self–Tuning of Fuzzy Reasoning by the Steepest Descent Method and Its Application to a Parallel Parking," IEICE Trans. Inf. & Syst., vol. E79–D, No. 5, May 1996, pp. 561–569.

Nomura et al, "A Learning Method of Fuzzy Inference Rules by Descent Method," IEEE International Conference on Fuzzy Systems, Mar. 1992, pp. 203–210.

Kim et al, "An Auto–Tuning Fuzzy Rule–Based Visual Servoing Algorithm for a Slave Arm," IEEE International Symposium on Intelligent Control, Aug. 1995, pp. 177–182.

(List continued on next page.)

*Primary Examiner*—William A Cuchlinski, Jr.
*Assistant Examiner*—Arthur D. Donnelly
(74) *Attorney, Agent, or Firm*—Suzanne L. K. Rountree

(57) ABSTRACT

A decentralized fuzzy logic control system for one vehicle or for multiple robotic vehicles provides a way to control each vehicle to converge on a goal without collisions between vehicles or collisions with other obstacles, in the presence of noisy input measurements and a limited amount of compute-power and memory on board each robotic vehicle. The fuzzy controller demonstrates improved robustness to noise relative to an exact controller.

22 Claims, 7 Drawing Sheets

OTHER PUBLICATIONS

Fukuda and Shimojima, "Fusion of Fuzzy, NN, GA to the Intelligent Robotics," 1995 IEEE International Conference on Systems, Man, and Cybernetics, vol. 3, Oct. 1995, pp. 2892–2897.

Cho and No, "Design of Stability–Guaranteed Fuzzy Logic Controller for Nuclear Steam Generators," IEEE Transactions on Nuclear Science, vol. 43, No. 2, Apr. 1996.

Driessen et al., "Decentralized Fuzzy Control of Multiple Nonholonomic Vehicles," Proceedings of the 1998 American Controls Conference, Philadelphia, Jun. 24–26, 1998.

Driankov et al., "An Introduction to Fuzzy Control," Springer–Verlag, New York, 1993, pp. 186–195.

Klarer and Purvis, "A Highly Agile Mobility Chassis Design for a Robotic All–Terrain Lunar Exploration Rover".

* cited by examiner

CONVERGENT METHOD OF AND APPARATUS FOR DISTRIBUTED CONTROL OF ROBOTIC SYSTEMS USING FUZZY LOGIC

This application claims the benefit of U.S. Provisional Application No. 60/141,054, filed Jun. 24, 1999.

This invention was made with Government support under Contract DE-AC04-94AL85000 awarded by the U.S. Department of Energy. The Government has certain rights in the invention.

BACKGROUND OF THE INVENTION

This invention relates to the field of robotic systems and more particularly to convergent control systems and methods suitable for distributed control of multiple robotic vehicles.

When numerous autonomous robotic vehicles are used in convergent search applications, each vehicle and the distributed control system for each vehicle must be inexpensive in order to be cost effective. Inexpensive on-board sensors can have noisy measurements. Also, the amount of compute power and memory on board each vehicle is likely to be small. This results in the need for robustness to noisy sensor measurements while using a simple controller. Kalman filters can be used to filter noisy sensor data, but Kalman filters can be relatively expensive to implement.

Robotic Vehicle Control Systems

Brook's Subsumption architecture is a widely used approach for control of multiple autonomous vehicles. See Brooks, "A Robust Layered Control System for a Mobile Robot," IEEE Journal of Robotics and Automation, RA-2, pp. 14–23, March 1986. Brooks teaches a layered control system implemented as an augmented finite state machine. Brooks' architecture is fast and simple to implement, but there is no theory regarding what the control laws should be or when to switch between them. Brook's Subsumption approach provides coordination at a higher level and relies on stable controls at a lower level. Consequently, Brooks provides control without predictable convergence characteristics.

Another category of work involving fuzzy control of robotic vehicles generated fuzzy rules with ad hoc, rather than predictable, convergence characteristics. See Maeda et al., "Behavior-Decision Fuzzy Algorithm for Autonomous Mobile Robots," Information Sciences, Vol. 71, pp. 145–168,1993; and Marapane et al., "Motion Control of Cooperative Robotic Teams Through Visual Observation and Fuzzy Logic Control," Proceedings of the 1996 International Conference on Robotics and Automation, pp. 1738–1743,1996. The ad hoc rules of Maeda et al. and Marapane et al. cannot guarantee convergence in finding a target; consequently, they are not suitable where provable convergence is required.

Phase plane analysis and variable structure control techniques have been used for stable control of single and multiple robotic vehicles. Sliding mode control is a subset of variable structure control. See, e.g., Feddema et al., "Explaining Finite State Machine Characteristics using Variable Structure Control," SPIE Conference on Sensor Fusion and Decentralized Control in Autonomous Robotic Systems, Pittsburg, Oct. 14–17, 1997, hereinafter referred to as Feddema'97; and Feddema et al., "Designing Stable Finite State Machine Behaviors using Phase Plane Analysis and Variable Structure Control," Proceedings of 1998 IEEE International Conference on Robotics and Automation, Belgium, May 16–21, 1998, hereinafter referred to as Feddema'98. The sliding mode control of Feddema'97 and Feddema'98 are good with robotic vehicles having a lot of on-board compute-power, but are unsuitable for robotic vehicles with limited compute-power and limited memory.

Many ways exist to generate fuzzy rules. See Miyata et al, "Self-Tuning of Fuzzy Reasoning by the Steepest Descent Method and Its Application to a Parallel Parking," IEICE Trans. Inf. & Syst., Vol. E79-D, No. 5, May 1996, pp. 561–569; Nomura et al, "A Learning Method of Fuzzy Inference Rules by Descent Method," IEEE International Conference on Fuzzy Systems, March 1992, pp. 203–210; Kim et al, "An Auto-Tuning Fuzzy Rule-Based Visual Servoing Algorithm for a Slave Arm," IEEE International Symposium on Intelligent Control, August 1995, pp. 177–182; Fukuda and Shimojima, "Fusion of Fuzzy, NN, GA to the Intelligent Robotics," 1995 IEEE International Conference on Systems, Man, and Cybernetics, Vol. 3, October 1995, pp. 2892–2897. Cho and No developed a provably stable fuzzy controller based upon a linear quadratic regulator theory and Lyapunov stability theory. See Cho and No, "Design of Stability-Guaranteed Fuzzy Logic Controller for Nuclear Steam Generators," IEEE Transactions on Nuclear Science, Vol. 43, No. 2, April 1996. Cho and No's method can be applied to the control of a single nuclear generator, but Cho and No's method cannot be applied to multiple robotic vehicles.

One example of a need for convergence of robotic vehicles is in military applications where autonomous robotic vehicles are used to locate (converge on) a bomb target. Another example is in chemical applications where autonomous robotic vehicles are used to locate a scent source. In convergent search applications utilizing multiple autonomous robotic vehicles, each vehicle with on-board sensors needs to be inexpensive. An inexpensive system can have a small amount of compute power, a small amount of memory, and noisy on-board sensors. This results in the need for robustness to noisy sensor measurements while using a simple controller. Accordingly, there is an unmet need for a control system suitable for multiple autonomous robotic vehicles that can be used where provable convergence is required.

SUMMARY OF THE INVENTION

This invention provides a distributed control system suitable for controlling one or multiple robotic vehicles to converge to a goal. The present invention controls one or more vehicles without collisions with obstacles, in the presence of noisy measurements and with a small amount of compute-power and memory on board each vehicle. The control system for each vehicle comprises a sensor and a fuzzy controller. The fuzzy controller can comprise a microcontroller, a memory accessible from the microcontroller, and a program stored in the memory that implements fuzzy control rules on the microcontroller. The fuzzy controller can take input from the sensor and can generate a set of vehicle control commands according to fuzzy control rules that result in provable vehicle convergence to a specified goal. The sensor can sense one or more needed inputs or can be a sensor subsystem that senses one or more needed inputs. Control commands can be any set of commands which result in a vehicle converging to a desired goal or scent source.

The present invention provides a new method for distributed robotic vehicle control that can control a single vehicle or multiple vehicles to converge to a goal.

BRIEF DESCRIPTION OF THE FIGURES

The accompanying drawings, which are incorporated into and form part of the specification, illustrate embodiments of the invention and, together with the description, serve to explain the principles of the invention.

FIG. 1 is a schematic of a robotic vehicle controlled by the present invention, showing vehicle reference frame 1.

DETAILED DESCRIPTION OF THE INVENTION

The present invention provides a control system for controlling a robotic vehicle to converge to a goal. The present invention provides a distributed control system for controlling multiple vehicles to converge to a goal. The present invention also provides a method for controlling one vehicle to converge to a goal and provides a method for controlling multiple vehicles to converge to a goal.

A robotic vehicle can be responsive to multiple inputs. In a convergence application, a robotic vehicle can have the following noisy measurements available to it: distance to its nearest neighbor vehicle (r, in meters), direction to a goal (for example, a scent source such as a chemical source or unexploded ordnance) in vehicle coordinates (φ, in radians), and direction to its closest neighbor vehicle in vehicle coordinates (α, in radians).

The present invention is suitable for use with nonholonomic vehicles. A nonholonomic vehicle is a vehicle that has fewer degrees of freedom than the space in which it operates. In a nonholonomic robotic vehicle, there can be more than one path generated to reach a specific goal. Nonholonomic vehicles can comprise tracked and wheeled vehicles with the limitation that they cannot instantaneously move in any desired direction but must instead use forward motion and steering to change direction.

Robotic Vehicle Description

Figure 1:
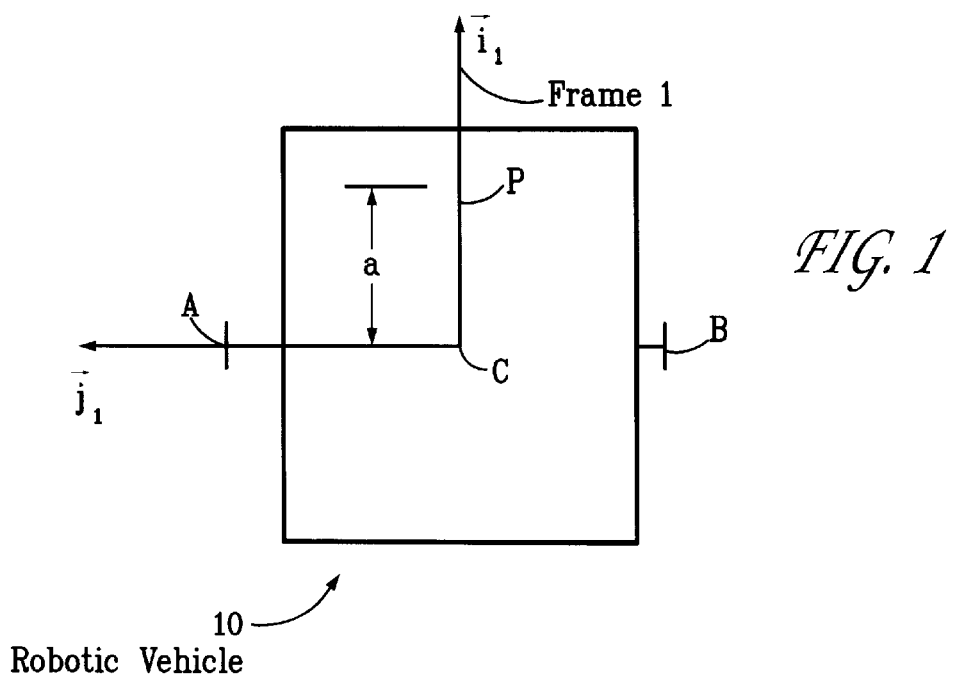

An example of a robotic vehicle that can be controlled according to the present invention is given in FIG. 1, which shows a schematic of robotic vehicle 10 and its vehicle reference frame, depicted as frame 1 (whose axes are $\bar{i}_1$ and $\bar{j}_1$). To better understand the control process, the following terms can be useful. Point C in FIG. 1 is at the midpoint of two independent driving wheels at points A and B. Point P can be fixed to the vehicle and be offset forward from point C by distance a. Let $u_1$ and $u_2$ denote linear velocities of points B and A, respectively (in the $\bar{i}_1$ direction). Also, let R denote one-half the distance between points A and B.

Figure 2:
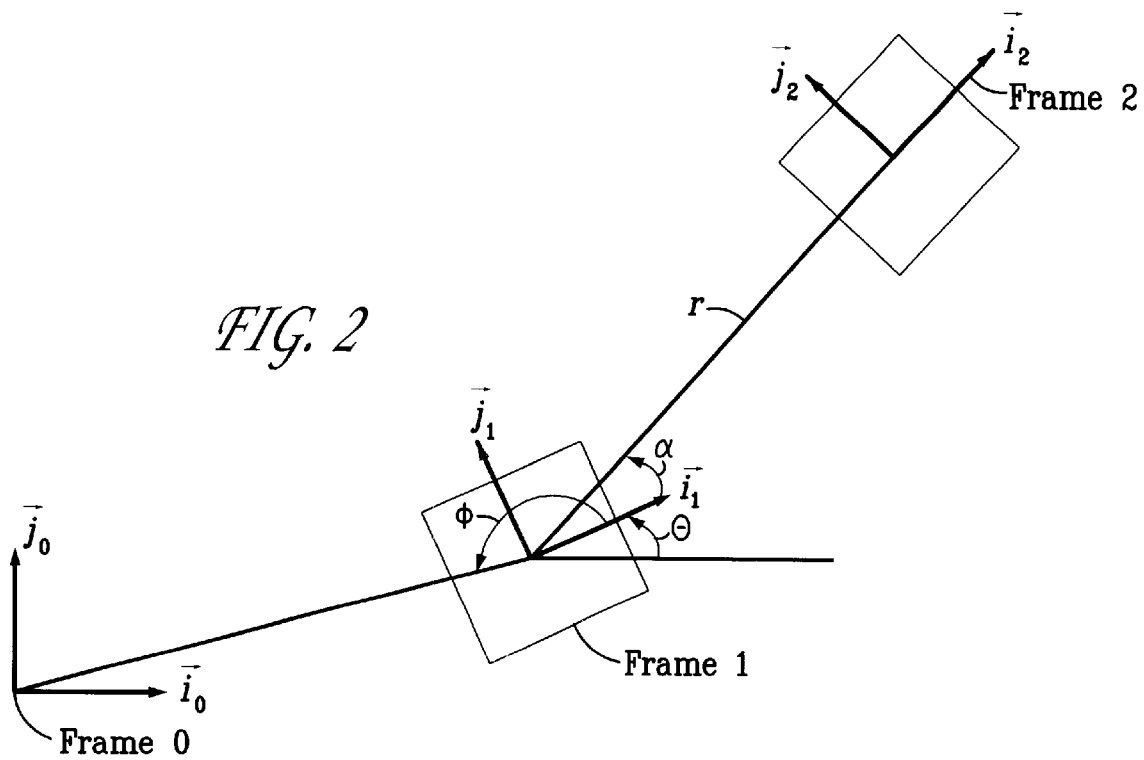
FIG. 2 is a schematic illustrating r, φ, and α for a vehicle, the vehicle's goal, and the vehicle's nearest obstacle.

FIG. 2 illustrates the definitions of r, φ, and α for a vehicle with respect to the vehicle's goal and the vehicle's nearest obstacle, for example, the nearest neighbor vehicle. Frame 1 can be fixed to the vehicle, where r is the distance to the nearest neighbor vehicle, shown in frame 2 coordinates; φ is the direction to a goal, denoted by frame 0; and α is the direction to the closest neighbor vehicle. Without loss of generality, frame 0 (whose axes are $\bar{i}_0$ and $\bar{j}_0$) is a fixed frame whose origin is the goal (for example, a scent source).

As shown in FIG. 2, let θ denote the orientation of the vehicle, denoted as the angle from $\bar{i}_0$ to $\bar{i}_1$, measured counterclockwise. Let φ be the angle, measured counterclockwise, from $\bar{i}_1$ to the vector that points from the origin of frame 1 to the origin of frame 0; that is, φ is the angular direction to the goal in vehicle coordinates. Let α be the angle from $\bar{i}_1$ (of vehicle 1) to $\bar{i}_2$ (of vehicle 2), and r be the distance between the two vehicles.

Fuzzy Controller

In an example of the present method of controlling robotic vehicles, a non-fuzzy control law can be fuzzified to produce a fuzzy controller according to the present invention. An example non-fuzzy control law, can be a linear quadratic regulator control law. See Driessen et al., "Decentralized Fuzzy Control of Multiple Nonholonomic Vehicles," Proceedings of the 1998 American Controls Conference, Philadelphia, Jun. 24–26, 1998, incorporated herein by reference. Control laws based on a repulsive force for collision avoidance and an attractive force toward a goal can be used to produce a fuzzy controller according to the present invention.

The simplification of the non-fuzy control law using fuzzy control rules can allow a convergent control system to be implemented on low-cost microcontrollers, for example, an 8-bit microcontroller or other simple and inexpensive microcontrollers, which can be used on multiple robotic vehicles, and even on miniature robotic vehicles (for example, vehicles substantially the size of a paperback book).

Figure 3:
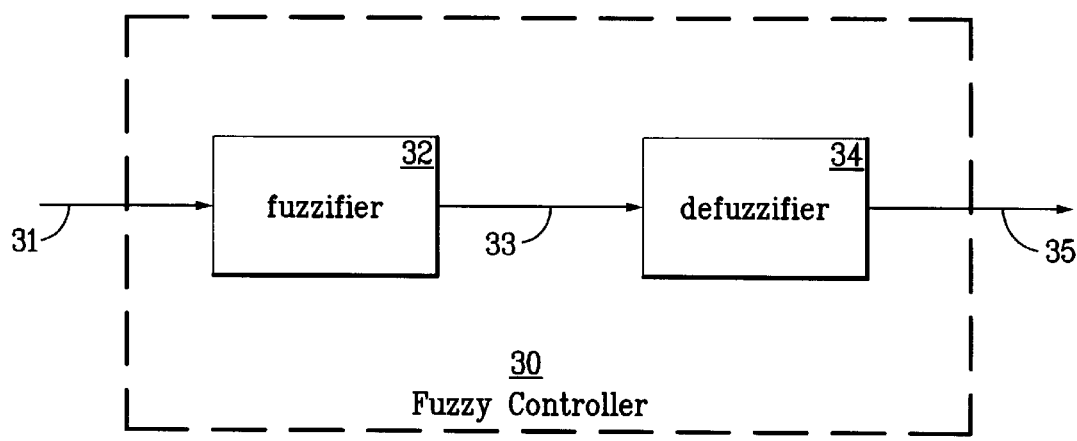
FIG. 3 is a diagram depicting a fuzzy controller according to the control system of the present invention.

FIG. 3 is a diagram depicting fuzzy controller 30 according to the control system of the present invention. Fuzzy controller 30 comprises fuzzifier 32 and defuzzifier 34, along with fuzzy controller input 31, fuzzy value 33, and output vehicle control 35.

Figure 5:
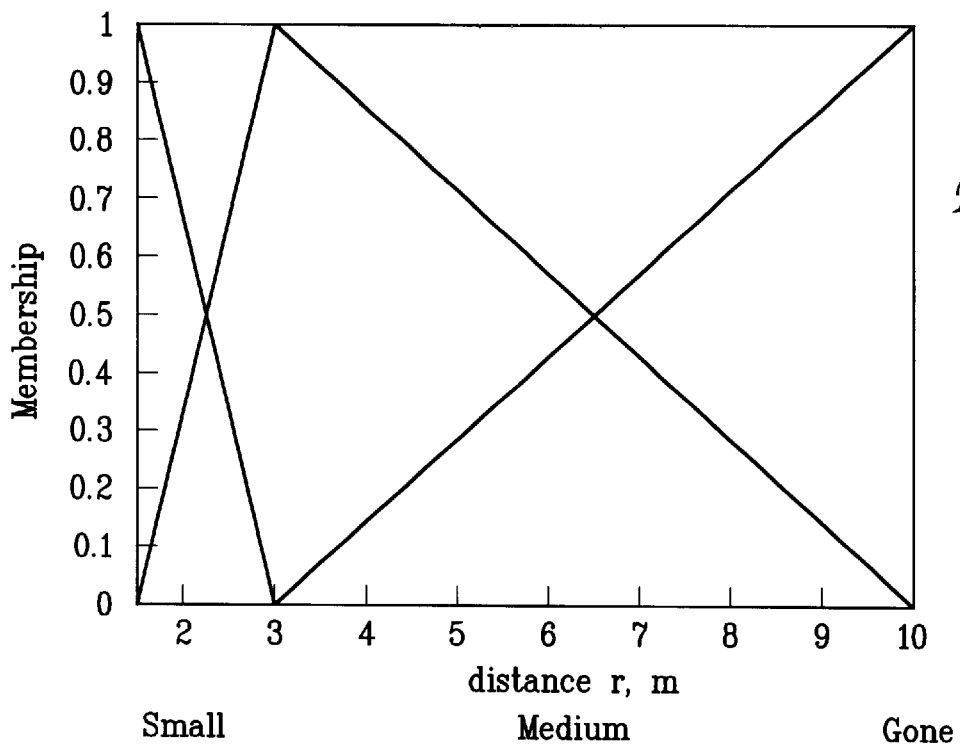
FIG. 5 is a graph depicting membership functions for distance to obstacle.
Figure 6:
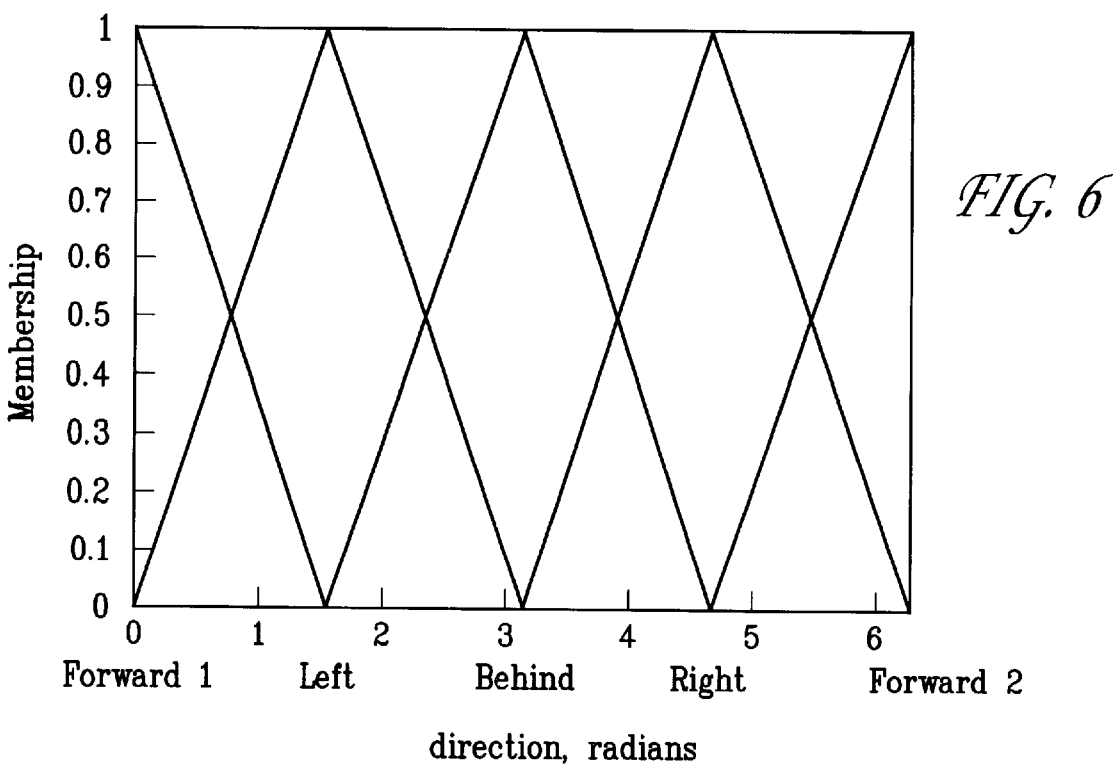
FIG. 6 is a graph depicting membership functions for direction to goal and direction to obstacle.

Fuzzy controller input 31, for example $x \in \Re^3$, can comprise three inputs: direction to goal, distance to obstacle, and direction to obstacle. Fuzzifier 32 can take controller input 31 and can approximate these exact inputs and output fuzzy value 33. Fuzzy value 33 can be a discrete controller input along with its associated probability as, for example, those obtained using a fuzzy membership function or other fuzzifier where controller input can be fuzzified and described using a small set of values each with a probability of occurrence and where the probabilities sum to one. FIGS. 5 and 6 are example graphs of fuzzy membership functions. Fuzzy value 33 can be input into defuzzifier 34. Defuzzifier 34 can take discrete fuzzy value 33 and can output vehicle control command 35 in continuous real values. Vehicle control command 35 can be commanded right and left linear wheel velocities, for example $u_1$ and $u_2$, where $u \in \Re^2$. Defuzzifier 34 can be a Sugeno Fuzzy Inference System or other defuzzifier known to those skilled in the art.

Control Process

Figure 4:
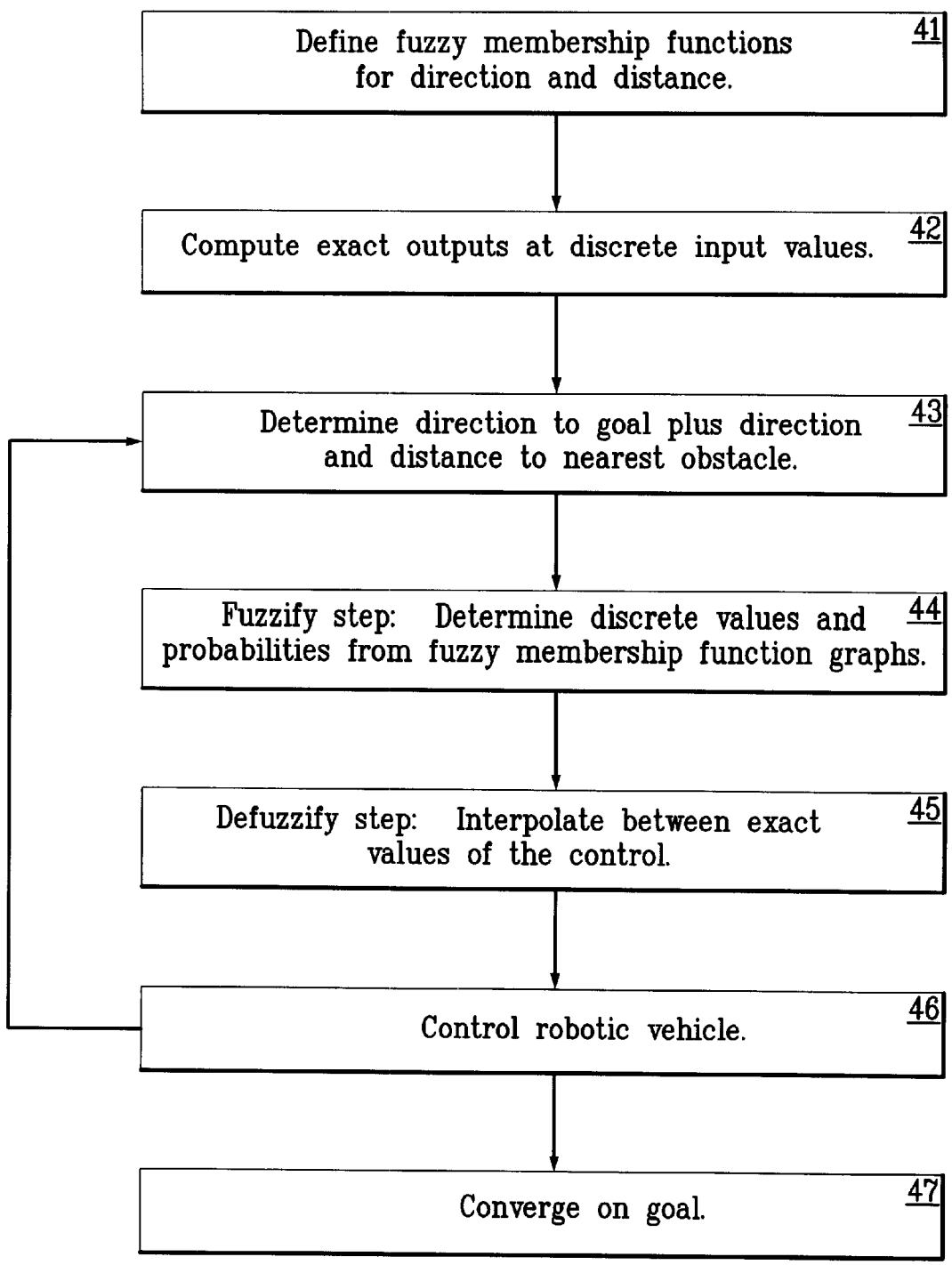
FIG. 4 is a flow diagram depicting a robotic vehicle control process according to the present invention with an example of a provably convergent fuzzy control method of controlling the robotic vehicle.

FIG. 4 is a flow diagram depicting a robotic vehicle control process according to the present invention with an example of a provably convergent fuzzy control method of controlling the robotic vehicle.

In setup step 41 of the control process, fuzzy membership functions for direction and distance can be defined. One simulated example control process can use the triangular membership functions shown in FIGS. 5 and 6 for each of the values of three inputs to the controller: distance to obstacle, direction to goal, and direction to obstacle. The fuzzy membership functions can be defined as complementary triangular graphs with vertices at membership probabilities 0 and 1 for specific values of the discrete inputs. For example, in FIG. 5, "small" has a value of 1.5 meters with probability 1. Other membership functions can also be used.

In an example embodiment, discrete inputs to the controller can be defined to have the following possible values for direction and distance, corresponding to the fuzzy membership functions shown in FIGS. 5 and 6:

Direction to Goal ($\phi$): Forward1, Left, Behind, Right, or Forward2

Direction to Obstacle ($\alpha$): Forward1, Left, Behind, Right, or Forward2

Distance to Obstacle (r): Small, Medium, Gone.

Thus, the example embodiment can have 5*5*3=75 possible "fuzzy" discrete input combinations to the controller. The value of "Small" can be chosen to be 1.5 meters, that of "Medium" to be 3 meters, and that of "Gone" to be 10 meters.

In setup step 42 of the process, exact controller outputs can be computed at the discrete input values, defined in step 41, and stored in a table or database. In the example embodiment, a linear quadratic regulator is implemented as the exact controller.

Steps 43 through 46 are part of a repeatable loop to obtain vehicle-specific inputs, to fuzzify controller inputs, to defuzzify the control to obtain vehicle velocities, and to control a robotic vehicle. The method of the present invention can be applied to multiple robotic vehicles, where the same fuzzy controller can be downloaded onto each vehicle's microcontroller and steps 43 through 46 can be repeated for each vehicle. Coordination between robotic vehicles can be accomplished by each vehicle having awareness of its nearest obstacle, or nearest neighboring vehicle, in order to avoid collisions. The details for steps 43 through 46 are explained below.

In step 43, the direction $\phi$ to a goal and the direction $\alpha$ and distance r to a nearest obstacle can be determined. The directions and distance can be measured by an on-board vehicle sensor or sensor subsystem. Noise on the direction to the obstacle can be taken to be smaller than noise on the direction to the goal since the former can come from communication signals between vehicles, while the latter can be measured with less accurate chemical sensors.

Step 44 is a fuzzify step in which discrete values and probabilities can be determined from fuzzy membership functions. In the example embodiment, each direction and distance value from step 43 can be used with the graphs in FIGS. 5 and 6 and can yield membership probabilities for two discrete values from the membership functions. For example, a given distance can yield "forward1" with probability=0.4 and "left" with probability=0.6.

Step 45 is a defuzzify step in which approximated control values can be obtained by interpolating between the stored exact values of the control, from step 42. The example fuzzy control embodiment uses a Sugeno Fuzzy Inference System as the defuzzifier. The Sugeno Fuzzy Inference System can be used to interpolate between the exact values of the control as given in Equations 4 and 5, in a following section, at the 75 combinations of discrete data points, defined in step 41. The resulting fuzzy controller can have the same input-output relationship as the exact controller at these discrete 75 points, but can have different values at any points in between. The Sugeno Fuzzy Inference System is known to those skilled in the art. See Driankov et al., "An Introduction to Fuzzy Control," Springer-Verlag, New York, 1993, pp. 186–195, for a reference on Sugeno inferencing. Software for Sugeno inferencing also is available; for example, the MATLAB software library has a toolbox which uses this method.

The output of step 45 can be used to control a robotic vehicle, step 46. The example control embodiment can output $u_1$ and $u_2$, the linear velocities of vehicle wheels at points B and A.

In a more detailed example with multiple robotic vehicles, this example control process can be distributed and applied to each vehicle separately, where the same fuzzy controller can be downloaded onto each vehicle's microcontroller and where steps 43 through 46 can be repeated for each vehicle. Each vehicle's sensor repeatedly can measure new vehicle-specific direction and distance inputs, then controller inputs can be fuzzified and a defuzzifier can be applied to obtain output wheel velocities to control each specific robotic vehicle. The process can continue until each vehicle can achieve convergence on the goal, step 47.

Non-Fuzzy, Exact Control

A non-fuzzy control law (for example, an exact control law such as a linear quadratic regulator) can be fuzzified to generate a fuzzy control law for implementation according to the description below. The non-fuzzy control solution can have an attractive force component and a repulsive force component.

In order to move a vehicle toward a goal while avoiding collisions with obstacles and other vehicles, the attractive force that pulls the vehicle in the direction $\phi$ of the scent source goal can be given by:

$$k\begin{pmatrix}\cos\phi\\\sin\phi\end{pmatrix}, \quad (1)$$

where the constant k is a scaling coefficient and where the vector in Equation 1 is expressed in vehicle frame 1 coordinates as in FIG. 2.

Collision avoidance can be obtained by using a $1/r^3$ repulsive force exerted along the line from a closest neighbor vehicle to the vehicle under control. The direction of this repulsive force, in frame 1, can be obtained through measurement of $\alpha$ (angular direction to the closest vehicle, in vehicle coordinates). In particular, this repulsive force, expressed in frame 1 coordinates, can be given by:

$$-\frac{kc_2}{r^3}\begin{pmatrix}\cos\alpha\\\sin\alpha\end{pmatrix}, \quad (2)$$

where the value of $c_2$ can be chosen large enough that any pair of vehicles will maintain a safe distance apart to avoid collision. A value of $c_2=10$ was used in the example simulations.

The absolute velocity, relative to frame 1, of a point P on the vehicle under control, $^1\bar{v}_P$, can be specified. Because of a no-slip condition at the two wheels (at points A and B in FIG. 1) in the example, the linear velocity of point C in FIG. 1 cannot be arbitrarily specified. However, motion of point P on the robotic vehicle to be controlled can be specified. An approach can be to let the repulsive and attractive forces determine the velocity of the point P, shown in FIG. 1. The absolute velocity of point P, expressed in frame 1 coordinates, can be given by:

$$^1\vec{v}_P = 1/2 \begin{bmatrix} 1 & 1 \\ a/R & -a/R \end{bmatrix} \begin{pmatrix} u_1 \\ u_2 \end{pmatrix}, \quad (3)$$

where $u_1$ and $u_2$ are the linear velocities of vehicle wheels at points B and A.

The determinant of the matrix in Equation 3 is $-\alpha/R$; therefore, this matrix is nonsingular. So, if absolute velocity $^1\vec{v}_P$ is specified, the required inputs $u_1$ and $u_2$ the linear velocities of wheels at points B and A that produce the absolute velocity, can be determined.

Combining Equations 1–3, the control can become:

$$\begin{pmatrix} u_1 \\ u_2 \end{pmatrix} = \begin{bmatrix} 1 & R/a \\ 1 & -R/a \end{bmatrix} {}^1\vec{v}_P \quad (4)$$

where $$^1\vec{v}_P = k \begin{pmatrix} \cos\phi \\ \sin\phi \end{pmatrix} - \frac{kc_2}{r^3} \begin{pmatrix} \cos\alpha \\ \sin\alpha \end{pmatrix}. \quad (5)$$

The direction of motion of point P in Equation 5 can be shown to be the linear quadratic regulator (LQR) solution for a single obstacle, where the LQR cost function J to be minimized (sometimes called a performance index) can be given by:

$$J \equiv \frac{1}{2}((x_p - x_g)^2 + (y_p - y_g)^2) + c_2 \frac{1}{(x_p - \bar{x})^2 + (y_p - \bar{y})^2}, \quad (6)$$

where $(\bar{x}, \bar{y})$ is the position of the obstacle, $(x_g, y_g)$ is the position of the goal, $(x_p, y_p)$ is the position of the point P on the vehicle, and $c_2$ is a weighting factor which penalizes the inverse of the distance between the vehicle and the nearest obstacle.

Differentiating Equation 6 with respect to $(x_p, y)^T$, results in:

$$\nabla J = \begin{pmatrix} x_P - x_g \\ y_P - y_g \end{pmatrix} - c_2 \frac{2}{[(x_P - \bar{x})^2 + (y_P - \bar{y})^2]^2} \begin{pmatrix} x_P - \bar{x} \\ y_P - \bar{y} \end{pmatrix}. \quad (7)$$

Note that $$r = \sqrt{(x_P - \bar{x})^2 + (y_P - \bar{y})^2};$$

let $\phi$ and $\alpha$ be the angular direction from vehicle point P to the goal and the obstacle to point P, respectively, in frame 1 coordinates; and also let $s \equiv \sqrt{(x_p - x_g)^2 + (y_P - y_g)^2}$. Then Equation 7 can be written as follows:

$$^1\vec{v}_P = -\nabla J = s \begin{pmatrix} \cos\phi \\ \sin\phi \end{pmatrix} - \frac{2c_2}{r^3} \begin{pmatrix} \cos\alpha \\ \sin\alpha \end{pmatrix}. \quad (8)$$

In Equation 8 for this example, the first term is in the same direction as the attractive force in Equation 1 and the second term is in the same direction as the repulsive force in Equation 2.

Convergence with Fuzzy Logic Membership Functions

Fuzzy logic membership functions, with few discrete values, can be used because convergence can be achieved as long as an estimate of the vehicle angle to the goal is within ±90 degrees of the actual angle to the goal. This can be shown by considering a linear perturbation of nonlinear dynamics of the vehicle:

$$\left(\left(\dot{x} = f(x, u) \approx f(x_o, u_o) + \frac{\partial f}{\partial x}\bigg|_{x_o,u_o}(x - x_o) + \frac{\partial f}{\partial u}\bigg|_{x_o,u_o}\right) \quad (9)$$
$$(u - u_o),$$

where $x \in \Re^3$ is the (x,y) position of the point P on the vehicle and orientation $\theta$, $u \in \Re^2$ is the commanded right and left linear wheel velocities, $f(x, u)$ are the first order vehicle dynamics, and $x_o$ and $u_o$ are linearized operating points. Equation 9 can be rewritten as:

$$\left(\left(\Delta\dot{x} = \frac{\partial f}{\partial x}\bigg|_{x_o,u_o} \Delta x + \frac{\partial f}{\partial u}\bigg|_{x_o,u_o} \Delta u\right) \quad (10)$$

where $$\Delta\dot{x} = f(x,u) - f(x_o,u_o)$$

$$\Delta x = x - x_o$$

$$\Delta u = u - u_o$$

The first order model of the skid-driven vehicle $\dot{x} = f(x,u)$ is:

$$\begin{bmatrix} \dot{x}_P \\ \dot{y}_P \\ \dot{\theta} \end{bmatrix} = \frac{1}{2} \begin{bmatrix} \cos\theta - \frac{a}{R}\sin\theta & \cos\theta + \frac{a}{R}\sin\theta \\ \sin\theta + \frac{a}{R}\cos\theta & \sin\theta - \frac{a}{R}\cos\theta \\ \frac{1}{R} & \frac{-1}{R} \end{bmatrix} \begin{bmatrix} u_r \\ u_l \end{bmatrix} \quad (11)$$

or $$\dot{x} = B(x)u,$$

where R is one-half the wheel base, a is the distance between the vehicle center C and point P, and $\theta$ is the orientation of the vehicle with respect to frame 0.

If $u_o = 0$, then $$\left(\frac{\partial f}{\partial x}\bigg|_{x_o,u_o}\right) = 0$$

and $\Delta u = u$. Since $$\left(\frac{\partial f}{\partial u}\bigg|_{x_o,u_o}\right) = B(x_o),$$

then $$\Delta\dot{x} = B(x_o)\Delta u. \quad (12)$$

The control can be chosen to be a weighted inverse Jacobian which is a function of the estimated state $\hat{x}$. Then, $$\Delta u = -[WB(\hat{x})]^{-1}\Delta p \quad (13)$$

where $$W = \begin{bmatrix} 1 & 0 & 0 \\ 0 & 1 & 0 \end{bmatrix} \text{ and } p = \begin{bmatrix} x_P \\ y_P \end{bmatrix}$$

and $$\Delta p = p - p_o$$

where $p_o$ is a linearized operating point. The matrix W can be chosen to drive $x_p, y_p$, to the desired reference position yet leave θ unconstrained.

Considering only the position of the vehicle, $$\Delta\dot{p} = -WB(x_o)[WB(\hat{x})]^{-1}\Delta p \tag{14}$$

or $$[sI + WB(x_o)[WB(\hat{x})]^{-1}]\Delta p = 0. \tag{15}$$

For $\Delta p \rightarrow 0$, $WB(x_o)[WB(\hat{x})]^{-1}$ must be positive definite. For the skid-driven dynamics in Equation 11, this occurs if and only if $-90° < \theta_o - \hat{\theta} < 90°$, thus giving convergence. An LQR controller can be designed, as in the example above, using a change of variables that can reduce a control problem from one with three degrees of freedom to a non-singular problem with only two degrees of freedom.

Multi-Vehicle Example

Exact and fuzzy control laws can be applied to a multi-vehicle embodiment of the present invention, where many vehicles can be controlled to reach a goal point or scent source. An obstacle for each vehicle i can be taken to be the vehicle that is nearest to vehicle i. The same control laws can be applied to all vehicles. An additional constraint can be imposed: a maximum wheel velocity (velocity of points A and B in FIG. 1) of $v_{max} = 0.45$ m/s, for a wheeled robotic vehicle, such as a RATLER™, like those developed by Sandia National Laboratories. See Klarer and Purvis, "A Highly Agile Mobility Chassis Design for a Robotic All-Terrain Lunar Exploration Rover," incorporated herein by reference. The maximum wheel velocity can be associated with a specific robotic vehicle or can be an arbitrary velocity. For the generation of the fuzzy controller data points, the speed-coefficient k (used in Equation 5) can be scaled down to k=0.1136, in order to guarantee that the fuzzy controller cannot generate a wheel velocity greater than the imposed $v_{max}$. For comparison, the exact controller can also use this value of k and additionally can scale $^1\bar{v}_P$ to a small enough value so that neither wheel velocity can exceed $v_{max}$. The parameter values used in the simulations discussed below are: a=R=0.58 meters, and $c_2$=10.

Figure 7:
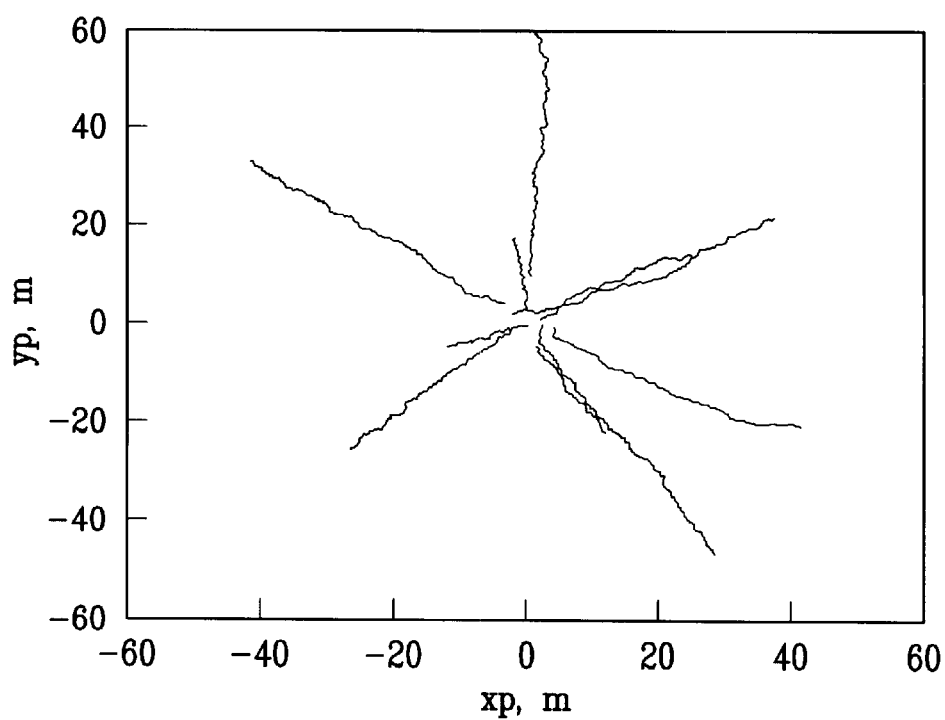
FIG. 7 is a graph depicting simulation results for exact controllers.
Figure 8:
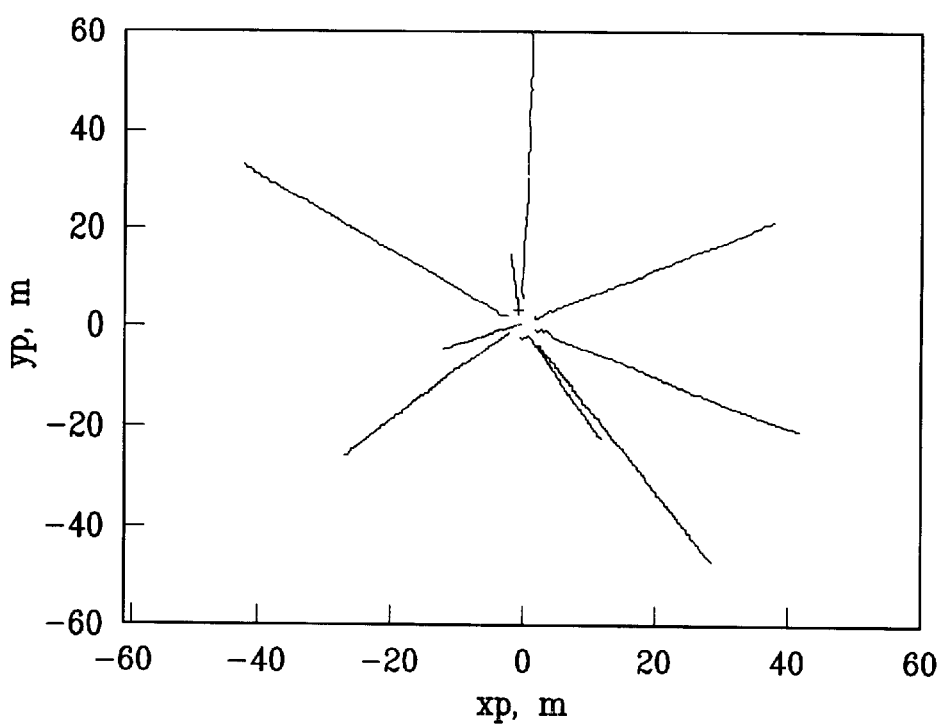
FIG. 8 is a graph depicting simulation results for fuzzy controllers according to the present invention.

The effect of having a 1-second update rate and noise in φ, r, and α was assessed in an example simulation. FIGS. 7 and 8 are graphs corresponding to simulations with the exact and fuzzy controllers, respectively, in which there was +/−90 degrees of noise (uniform) in the direction-to-goal, +/−9 degrees of noise in the direction-to-obstacle, +/−0.4 meters of noise in the distance to the obstacle (closest vehicle), and a slow 1-second update rate on the inputs to the controller. The controls in this example simulation could be held constant over each such interval. The total integration time for both FIG. 7 and FIG. 8 was 780 seconds. The initial positions of the vehicles for FIGS. 7 and 8 are those path endpoints that are farthest from the goal located at x=0, y=0.

Figure 9:
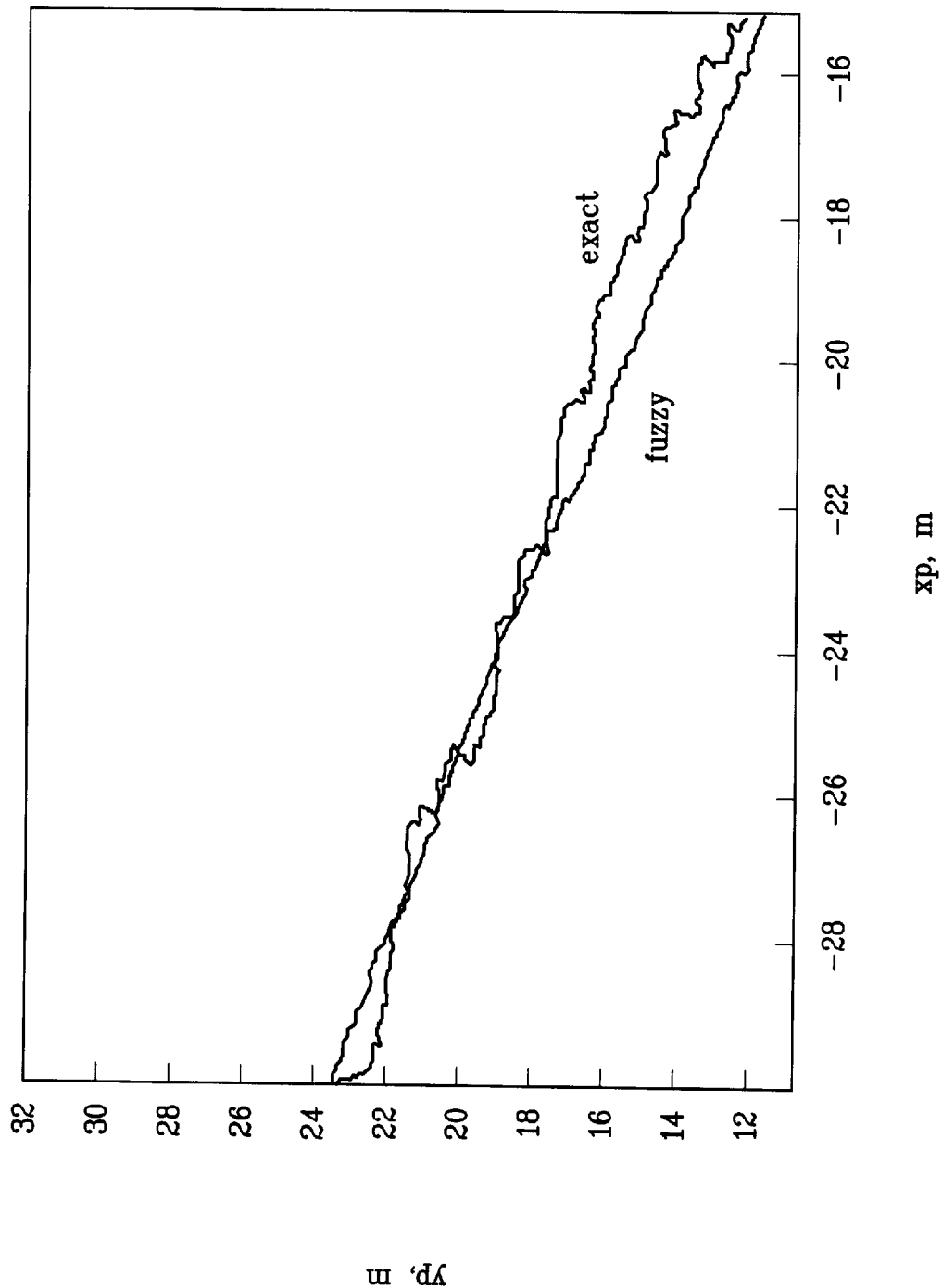
FIG. 9 is a graph depicting a comparative view of the simulation results of FIGS. 7 and 8.

The simulation results for the fuzzy controller shown in FIG. 8 are smoother than the simulation results for the exact LQR controller shown in FIG. 7. FIG. 9 shows a blown up overlay comparison of one of the simulation paths from FIGS. 7 and 8.

Simulated Comparison of Controllers

Smoothing can be inherent in the fuzzy membership functions and the defuzzification (for example, the Sugeno fuzzy inference system).

On the other hand, a non-fuzzy control law (for example, an exact linear quadratic control law) does not filter out noisy data. A Kalman filter can be used with a linear quadratic regulator (LQR) control law to overcome this deficiency and to filter noisy sensor data for a smoother path. An extended Kalman filter can be implemented to estimate an exact state-transition function, then the estimate can be input to the LQR control to obtain wheel velocity outputs.

Figure 10:
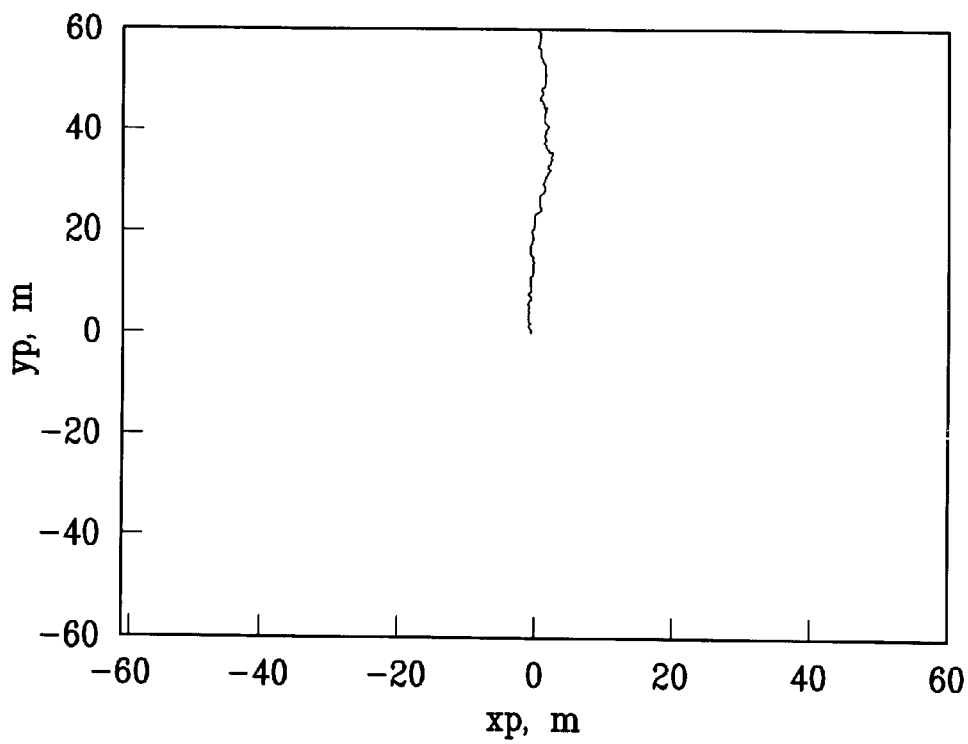
FIG. 10 is a graph depicting exact controller results.
Figure 11:
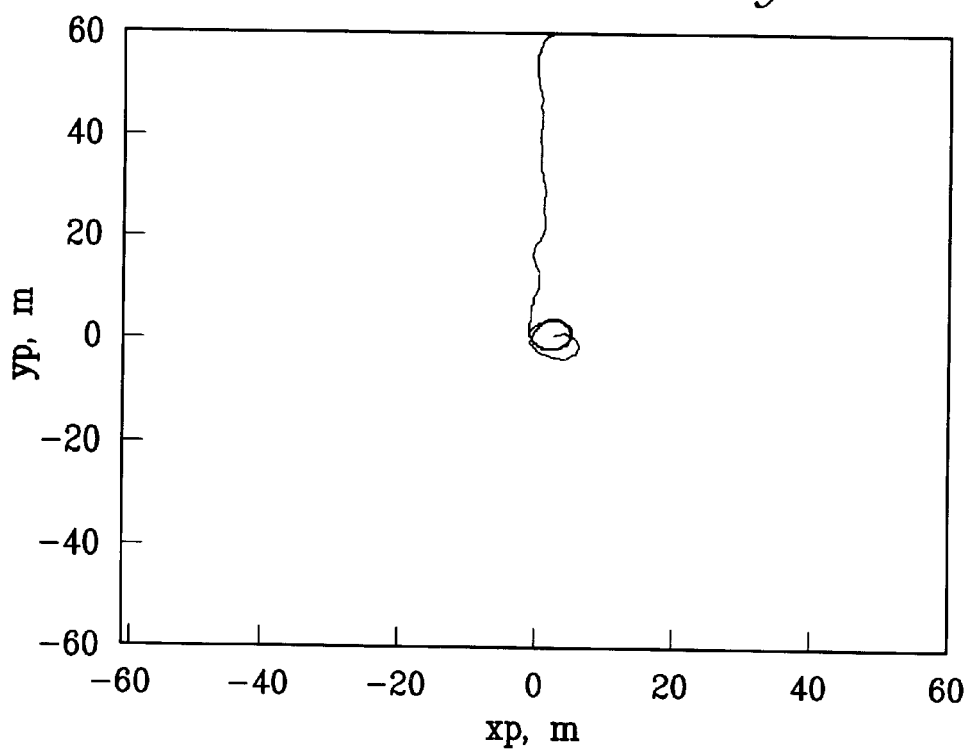
FIG. 11 is a graph depicting Kalman controller results.

FIGS. 10 and 11 show single vehicle simulations with +/−90 degrees of noise on a direction to goal and a 1-second ZOH (zero order hold). In this simulated case, readings are taken at one-second intervals to approximate analog signals with digital and provide a 1-second update rate on the inputs to the controller. FIG. 10 is a graph depicting unfiltered exact controller results. FIG. 11 is a graph depicting filtered Kalman controller results, where a Kalman filter was used with an LQR controller. The Kalman filter is more computationally intensive and can be seen to exhibit more smoothing than the unfiltered exact controller. As seen in FIG. 11, the Kalman filtered controller overshoots the target before circling back to the target; the exact controller does not. The fuzzy controller with LQR set points, as in examples according to the present invention, exhibits more smoothing, like the more expensive and computationally intensive Kalman filter; but the fuzzy controller, like the exact LQR controller, does not overshoot the target.

In the Kalman estimator implementation, measurement of φ, the angular direction to the goal, and u the linear velocities of wheels, are not sufficient to achieve estimation of the full exact input-state x. More measurements, such as the distance to the goal, would be needed to achieve full state estimation. However, the distance to the goal may not be measurable, in scent seeking problems, since the strength of the scent source may be unknown.

The smoothness and performance of the fuzzy controller compared favorably to the controller that used a Kalman estimator, and the fuzzy controller does not require a measurement of the distance to the goal. Decentralized fuzzy control can smoothly control multiple nonholonomic vehicles.

The particular sizes and equipment discussed above are cited merely to illustrate particular embodiments of the invention. It is contemplated that the use of the invention may involve components having different sizes and characteristics. It is intended that the scope of the invention be defined by the claims appended hereto.

We claim:

1. A control system for controlling a vehicle to converge to a goal, wherein the control system comprises:
   a) a sensor, mounted with the vehicle; and
   b) a fuzzy controller, having predictable convergence characteristics, responsive to the sensor, generating a plurality of vehicle control commands to converge to the goal;
   c) wherein the sensor is indicative of an input combination comprising: a direction to the goal, a direction to a nearest obstacle, and a distance to the nearest obstacle.

2. The control system of claim 1, wherein the fuzzy controller comprises:
   a) a microcontroller, mounted with the vehicle, responsive to the sensor;

b) a memory accessible from the microcontroller; and c) a program, stored in the memory, implementing fuzzy control rules on the microcontroller.

3. The control system of claim 1, wherein the fuzzy controller comprises a fuzzifier and a defuzzifier.

4. The control system of claim 3, wherein the fuzzifier comprises:

a) a set of discrete values for an input measurement; and b) a fuzzy membership function, indicative of a probability, corresponding to the set of discrete values for the input measurement.

5. The control system of claim 4, wherein the fuzzy membership function comprises: a direction membership function and a distance membership function.

6. The control system of claim 1, wherein the defuzzifier comprises:

a) an exact control value, corresponding to the input combination;

b) a storage mechanism, containing the exact control value; and c) an inference system, generating a vehicle control command from a plurality of exact control values.

7. The control system of claim 6, wherein the inference system is a Sugeno Fuzzy Inference System.

8. The control system of claim 6, wherein the exact control value corresponds to a linear quadratic regulator solution for a single obstacle with a cost function J given by:

$$J = 1/2((x_P - x_g)^2 + (y_P - y_g)^2) + c_2 \frac{1}{(x_P - \overline{x})^2 + (y_P - \overline{y})^2},$$

where $(\overline{x},\overline{y})$ is the position of the nearest obstacle, $(x_g,y_g)$ is the position of the goal, $(x_P,y_P)$ is the position of a point P on the vehicle, and $c_2$ is a weighting factor.

9. The control system of claim 1, wherein the vehicle is a nonholonomic vehicle.

10. A distributed control system for controlling a plurality of vehicles to converge to a goal, wherein the distributed control system comprises a vehicle control system on each vehicle, wherein each vehicle control system comprises:

a) a sensor, mounted with the vehicle; and b) a fuzzy controller, responsive to the sensor, generating a plurality of vehicle control commands to converge to the goal;

c) wherein the sensor is indicative of an input measurement comprising:

a direction to the goal, a direction to a nearest obstacle, and a distance to the nearest obstacle.

11. The distributed control system of claim 10, wherein the fuzzy controller comprises:

a) a microcontroller, mounted with the vehicle, responsive to the sensor;

b) a memory device accessible from the microcontroller; and c) a program implementing fuzzy control rules on the microcontroller.

12. The distributed control system of claim 10, wherein the fuzzy controller comprises a fuzzifier and a defuzzifier.

13. The distributed control system of claim 12, wherein the fuzzifier comprises:

a) a set of discrete values for the input measurement; and b) a fuzzy membership function, indicative of a probability, corresponding to the set of discrete values for the input measurement.

14. The distributed control system of claim 13, wherein the fuzzy membership function comprises:

a) a triangular function, indicative of the probability between 0 and 1, inclusive; and b) a complementary function, indicative of a complementary probability;

c) wherein the probability and the complementary probability sum to 1.

15. The distributed control system of claim 12, wherein the defuzzifier comprises:

a) an exact control value, corresponding to an input measurement;

b) a storage mechanism, containing the exact control value; and c) an inference system, generating a vehicle control command from a plurality of exact control values.

16. The distributed control system of claim 10, wherein the vehicle comprises a wheeled robotic vehicle, comprising:

a) a distance, denoted R, equal to one-half the distance between two independent driving wheels on the vehicle; and b) an offset distance, denoted a, between a point at the midpoint between the two independent driving wheels and a point P fixed to the vehicle.

17. The distributed control system of claim 16, wherein the distance R is substantially equal to 0.58 meters, and wherein the offset distance a is substantially equal to 0.58 meters.

18. A method for controlling a vehicle to converge to a goal, wherein the vehicle comprises a sensor, a microcontroller, and a memory device, wherein the method comprises:

a) accepting an input measurement from the sensor;

b) fuzzifying the input measurement, according to a fuzzy control rule, to generate a discrete controller input; and c) defuzzifying the discrete controller input, according to an inference system, to generate a vehicle control command;

d) wherein the input measurement comprises: a direction to the goal, a direction to a nearest obstacle, and a distance to the nearest obstacle.

19. The method of claim 18, wherein the step of fuzzifying the input measurement comprises:

a) defining a set of discrete values for the input measurement;

b) generating a fuzzy membership function, indicative of a probability, corresponding to the set of discrete values for the input measurement; and c) generating a discrete controller input, according to a fuzzy membership function applied to the input measurement.

20. The method of claim 18, wherein the step of defuzzifying the discrete controller input comprises:

a) determining an exact control value, corresponding to the input measurement;

b) storing the exact control value; and c) interpolating from a plurality of exact control values and from the discrete controller input, to generate a vehicle control command.

21. A method for controlling a plurality of vehicles to converge to a goal, wherein each vehicle comprises a sensor, a microcontroller, and a memory device, wherein the method comprises:
   a) defining a set of discrete values for an input measurement;
   b) generating a fuzzy membership function, indicative of a probability, corresponding to the set of discrete values for the input measurement;
   c) determining an exact control value, corresponding to the input measurement;
   d) on each vehicle, storing the exact control value; and
   e) on each vehicle:
      i) accepting an input measurement from the sensor;
      ii) generating a discrete controller input, according to the fuzzy membership function applied to the input measurement;
      iii) interpolating from a plurality of exact control values and from the discrete controller input, to generate a vehicle control command;
      iv) controlling the vehicle according to the vehicle control command; and
      v) repeating steps (i) through (iv) to control the vehicle until the vehicle converges to the goal;
      vi) wherein the input measurement comprises: a direction to the goal, a direction to a nearest obstacle, and a distance to the nearest obstacle.

22. A method for controlling a plurality of vehicles to converge to a goal, wherein each vehicle comprises a sensor, a microcontroller, and a memory device, wherein the method comprises:
   a) defining a set of discrete values for an input measurement;
   b) generating a fuzzy membership function, indicative of a probability, corresponding to the set of discrete values for the input measurement;
   c) determining an exact control value, corresponding to the input measurement;
   d) on each vehicle, storing the exact control value; and
   e) on each vehicle:
      i) accepting an input measurement from the sensor;
      ii) generating a discrete controller input, according to the fuzzy membership function applied to the input measurement;
      iii) interpolating from a plurality of exact control values and from the discrete controller input, to generate a vehicle control command;
      iv) controlling the vehicle according to the vehicle control command; and
      v) repeating steps (i) through (iv) to control the vehicle until the vehicle converges to the goal;
   f) wherein the exact control value corresponds to a linear quadratic regulator solution for a single obstacle with a cost function J given by:

$$J = 1/2((x_p - x_g)^2 + (y_p - y_g)^2) + c_2 \frac{1}{(x_p - \bar{x})^2 + (y_p - \bar{y})^2},$$

where $(\bar{x},\bar{y})$ is the position of the nearest obstacle, $(x_g,y_g)$ is the position of the goal, $(x_p,y_p)$ is the position of a point P on the vehicle, and $c_2$ is a weighting factor.

* * * * *